United States Patent
Jannot et al.

(10) Patent No.: US 11,949,284 B2
(45) Date of Patent: Apr. 2, 2024

(54) STATOR FOR A ROTATING ELECTRICAL MACHINE

(71) Applicant: Moteurs Leroy-Somer, Angouleme (FR)

(72) Inventors: Xavier Jannot, Angouleme (FR); Francois Turcat, Montignac sur Charente (FR); Cedric Plasse, Linars (FR); Olivier Gas, Gond-Pontouvre (FR)

(73) Assignee: MOTEURS LEROY-SOMER, Angouleme (FR)

( * ) Notice: Subject to any disclaimer, the term of this patent is extended or adjusted under 35 U.S.C. 154(b) by 596 days.

(21) Appl. No.: 17/057,969

(22) PCT Filed: Jun. 4, 2019

(86) PCT No.: PCT/EP2019/064504
§ 371 (c)(1),
(2) Date: Nov. 23, 2020

(87) PCT Pub. No.: WO2019/234031
PCT Pub. Date: Dec. 12, 2019

(65) Prior Publication Data
US 2021/0218293 A1 Jul. 15, 2021

(30) Foreign Application Priority Data
Jun. 7, 2018 (FR) ...................................... 1854959

(51) Int. Cl.
*H02K 1/16* (2006.01)
*H02K 3/12* (2006.01)
(Continued)

(52) U.S. Cl.
CPC ............... *H02K 1/165* (2013.01); *H02K 3/12* (2013.01); *H02K 15/024* (2013.01); *H02K 15/062* (2013.01)

(58) Field of Classification Search
CPC ........ H02K 1/165; H02K 3/12; H02K 15/024; H02K 15/062; H02K 3/493
See application file for complete search history.

(56) References Cited

U.S. PATENT DOCUMENTS 2,711,008 A * 6/1955 Smith ...................... H02K 1/16
29/605
3,320,451 A 5/1967 Wiley
(Continued)

FOREIGN PATENT DOCUMENTS

EP 1175720 A1 1/2002
EP 3154154 A1 4/2017
(Continued)

OTHER PUBLICATIONS

International Search Report (ISR) for PCT/EP2019/064504 dated Jul. 24, 2019 (6 pages).
(Continued)

*Primary Examiner* — Burton S Mullins
(74) *Attorney, Agent, or Firm* — Shumaker, Loop & Kendrick, LLP

(57) ABSTRACT

A stator including a ring having teeth and slots between said teeth that open radially outwards and material bridges, each linking two adjacent teeth to the respective base on the side of the air-gap, a yoke attached to the ring, and windings placed in the slots of the ring, at least some of the material bridges having at least on deformable zone that can be deformed during assembly of the yoke on the ring.

18 Claims, 5 Drawing Sheets

(51) Int. Cl.
  *H02K 3/493* (2006.01)
  *H02K 15/02* (2006.01)
  *H02K 15/06* (2006.01)

(56) References Cited

U.S. PATENT DOCUMENTS

| | | | |
|---|---|---|---|
| RE34,667 E | | 7/1994 | Neumann |
| 5,498,917 A | * | 3/1996 | Ninomiya ............... H02K 1/16 |
| | | | 310/216.069 |
| 6,064,132 A | * | 5/2000 | Nose ........................ H02K 1/08 |
| | | | 310/216.106 |
| 6,225,725 B1 | * | 5/2001 | Itoh ....................... H02K 5/143 |
| | | | 310/214 |
| 6,429,568 B1 | * | 8/2002 | Shen ..................... H02K 15/02 |
| | | | 310/254.1 |
| 6,844,653 B2 | | 1/2005 | Kolomeitsev et al. |
| 6,935,011 B2 | * | 8/2005 | Shiah .................. H02K 15/022 |
| | | | 310/43 |
| 7,528,519 B2 | * | 5/2009 | Miyashita .............. H02K 1/148 |
| | | | 310/216.001 |
| 7,560,844 B2 | * | 7/2009 | Miyashita .............. H02K 29/03 |
| | | | 310/43 |
| 7,646,129 B2 | | 1/2010 | Evans |
| 7,851,966 B2 | | 12/2010 | Rippel |
| 8,129,880 B2 | | 3/2012 | Rahman et al. |
| 10,177,611 B2 | * | 1/2019 | Kawasaki ................ H02K 3/12 |
| 10,630,155 B2 | * | 4/2020 | Li ......................... H02K 29/03 |
| 11,489,375 B2 | * | 11/2022 | Li ............................ H02K 1/148 |
| 2003/0193260 A1 | | 10/2003 | Reiter, Jr. et al. |
| 2003/0201687 A1 | * | 10/2003 | Asai ...................... H02K 3/493 |
| | | | 310/216.069 |
| 2006/0108890 A1 | | 5/2006 | Hauger et al. |
| 2007/0075604 A1 | * | 4/2007 | Hsu ...................... H02K 15/066 |
| | | | 310/216.023 |
| 2010/0007236 A1 | | 1/2010 | Sano et al. |
| 2011/0037338 A1 | | 2/2011 | Leiber et al. |
| 2012/0275942 A1 | | 11/2012 | Knapp et al. |
| 2016/0365756 A1 | | 12/2016 | Li et al. |
| 2017/0033620 A1 | | 2/2017 | Saint-Michel |
| 2017/0055669 A1 | | 3/2017 | Li et al. |
| 2018/0115202 A1 | | 4/2018 | Hirotani et al. |

FOREIGN PATENT DOCUMENTS

| | | |
|---|---|---|
| EP | 3288155 A1 | 2/2018 |
| FR | 3019947 A1 | 10/2015 |
| JP | H-027839 A | 1/1990 |
| JP | 2875497 B2 | 3/1999 |
| JP | 2001218429 A | 8/2001 |
| JP | 2011-097723 A | 5/2011 |
| JP | 2017-118744 A | 6/2017 |
| WO | 2017110476 A | 6/2017 |
| WO | 2019234024 A1 | 12/2019 |

OTHER PUBLICATIONS

International Search Report (ISR) for PCT/EP2019/064495 dated Jul. 24, 2019 (5 pages).

Non-Final Office Action (NFOA) issued for U.S. Appl. No. 17/057,972, dated Jun. 20, 2023 (13 pages).

Non-Final Office Action (NFOA) issued for U.S. Appl. No. 17/057,972, dated Nov. 14, 2023 (13 pages).

* cited by examiner

STATOR FOR A ROTATING ELECTRICAL MACHINE

TECHNICAL FIELD AND BACKGROUND

The present invention relates to rotating electrical machines and more specifically the stators of such machines.

JP 2875497 relates to a stator of an electric machine including an indented ring in which the portions located between two consecutive teeth are narrowed on the side of the air-gap.

JP 2011-097723 (D3) discloses individual teeth attached to a yoke.

In most known stators, the yoke provides fully open or semi-open slots facing the air-gap to enable the insertion of windings. Semi-open slots usually receive electrical conductors with a circular cross section arranged in bulk, while open slots seat electrical conductors with a rectangular cross section arranged in rows.

The openings of the slots towards the air-gap can cause non-negligible electromagnetic disturbances, notably an increase of the "magnetic" air-gap on account of the flow fringes, higher iron losses on the surface of the rotor for the same reason, or pulsating torque since the permeance variations are relatively stark.

Patent application FR 3019947 describes a stator including an indented ring with teeth that are joined together by material bridges, and slots between the teeth for seating the windings, said slots opening radially outwards. The openings of the slots are closed by a yoke attached to the indented ring.

There is a need for a stator of a rotating electrical machine that is easy to assemble and that enables the slots to be filled efficiently, while ensuring satisfactory electromagnetic performance.

SUMMARY

The invention meets this need by means of a stator comprising:
- a ring comprising:
  - teeth and slots between said teeth that open radially outwards, and
  - material bridges, each linking two adjacent teeth to the respective base on the air-gap side,
- a yoke attached to the ring, and
- windings placed in the slots of the ring, at least some of these material bridges having at least one deformable zone that can be deformed during assembly of the yoke on the ring and/or insertion of the windings in the slots.

"Deformable zone" means a zone of the material bridge that is preferably deformed by a relative movement of the teeth linked by said bridge. The deformation of the material bridge can be an elongation or a shortening of the circumference of the material bridge, which results in an elongation or a shortening of the circumference of the ring. The preferred deformation can result in the bridge adopting a specific shape.

"Attached yoke" means that the yoke is not integral with the ring, but fastened thereto during manufacture of the stator.

The deformable zone enables the ring to withstand the mechanical stresses applied thereto during assembly of the ring with the yoke. Furthermore, this enables the slots to be more open before assembly of the yoke, if desired, and therefore greater clearance between the windings and the wall of the slots during insertion of the windings, which facilitates said insertion and reduces the risk of the insulators being damaged.

The yoke closes the slots in the ring and holds the windings in the slots following insertion. During manufacture of the stator, the yoke can be assembled with the ring in different ways. The deformable zones of the material bridges facilitate this assembly by providing a degree of flexibility in the ring, which enables the ring to adapt to the shape of the yoke during assembly of the yoke, which is more rigid and determines the shape.

The ring and the yoke can also be assembled with a clearance therebetween, before increasing the diameter of the ring by deforming the ring using the deformable zones to reduce said clearance.

Furthermore, the presence of material bridges reduces the risk of varnish loss in the air-gap during varnish-impregnation of the completed stator. This helps to reduce cleaning requirements.

This also helps to reduce varnish leaks into the air-gap during operation of the machine on which the stator is mounted. This simplifies maintenance of the machine.

The term "varnish" should be understood here in the broad sense and covers all types of impregnation material, in particular polymer.

The deformable zone preferably forms a clearance between the material bridge and the corresponding winding, which can facilitate penetration of the varnish during impregnation of the stator.

The fact that the slots are closed after assembly of the yoke eliminates the risk of impregnation varnish leaking into the air-gap. The stator can be used as a closed impregnation enclosure, providing a seal at the ends of the stator only. This simplifies tooling. This also reduces the quantity of varnish lost and cleaning operations.

The fact that the slots open radially outwards enables the windings to be inserted in the slots by means of a radial movement towards the inside of the slots. The installation of the windings is facilitated firstly because access to the inside of the slots is easier, the slots being fully open and facing the outside rather than the air-gap, and secondly because the space available about the ring for the necessary tools or for a winding machine is larger than the space available in the bore of the stator.

Furthermore, such a stator has numerous electromagnetic advantages over a stator with slots opening onto the air-gap. This helps to significantly reduce the electromagnetic disturbances related to the presence of slot openings facing the air-gap in the prior art. Furthermore, since filling the slots is easier, the filling rate can be improved, which helps to further increase the performance of the machine. The torque density can be increased.

The absence of slot openings facing the air-gap helps to reduce slot pulsation.

The electromagnetic performance of the machine is improved.

Stator

Slots

At least one slot, and preferably all of the slots, can have opposing parallel edges. The width of the slots is preferably substantially constant over the entire height thereof.

At least one tooth, and preferably all of the teeth, can have an overall trapezoid shape when viewed in section in a plane perpendicular to the axis of the stator.

Preferably, each material bridge has at least one deformable zone. This enables the diameter of the ring to be varied over a wider range of values and provides magnetic properties that are more uniform.

Preferably, the material bridges are continuous with the teeth, extending from the base of these latter.

Preferably, the material bridges are integrally formed with the teeth.

Preferably, there is material continuity between the bases of the teeth provided by the material bridges.

Preferably, each material bridge has a single deformable zone.

The deformable zones can be centered on the corresponding material bridge or otherwise.

Preferably, each deformable zone is a corrugation forming at least one groove on one of the sides of the material bridge, for example the side facing the air-gap, and a projecting relief on the opposite side. Preferably, the grooves open towards the air-gap and the projecting reliefs extend into the bottom of the slot.

Preferably, the projecting reliefs extend into a recess in the bottom of the corresponding slot, the projecting reliefs being notably of height equal to or less than the depth of said recess. This prevents the reliefs from overshooting the bottom of the slot, thereby facilitating the filling of the slot by the windings. Preferably, following deformation of the material bridge, the height of the projecting reliefs remains equal to or less than the depth of said recess.

The material bridges with a deformable zone can have a center line, when the stator is viewed along the rotation axis, that is curved or in the form of a broken line, notably arched or V-shaped.

In a variant, the deformable zone is a zone of the material bridge that can be stretched and deformed by stretching to form a constriction during assembly of the ring on the yoke and/or during insertion of the windings in the slots.

Preferably, the deformable zones are zones of the material bridge that are saturated magnetically during operation of the machine. This improves the passage of the electromagnetic flow between the slots and the air-gap, which helps to minimize harmonics and to obtain more torque by desaturation of the teeth and of the yoke.

Preferably, the bottom of each of the slots has at least one flat portion against which a winding, preferably of substantially rectangular section, bears. The flat portion or portions are substantially perpendicular to the radial axis of the slot.

The bottom of the slot can be flat, with the exception of a recess.

As a variant, the bottom of the slot can be entirely flat and the material bridge can be deformed by stretching to form a constriction, as mentioned above.

The deformable zone or the recess preferably forms a clearance between the material bridge and the corresponding winding, which can facilitate penetration of the varnish during impregnation of the stator.

This enables the slots to be well filled by the windings in the case of windings of rectangular cross section, enabling the windings to bear flat against the bottom of the slot.

Yoke-Ring Interface

Preferably, the ring has reliefs on the radially external surface thereof that cooperate with the cooperating reliefs of the yoke, which are notably nested with one another. Such reliefs enable the ring and the yoke to be fastened to one another by form fitting. The cooperating reliefs are preferably dovetails and mortises.

The ring can be made by winding a strip of sheet metal with teeth joined by material bridges into a helix, with the opposite edges of each slot preferably being substantially parallel with one another when the strip is wound about itself to form the ring.

In a variant, the strip can be formed of sectors, each having several teeth, in which the sectors are linked by links and cut from a strip of sheet metal. The links can be flexible bridges linking the sectors together and/or parts with matching shapes, for example dovetails and mortises or matching reliefs bearing against one another, notably when the ring is held in compression by the yoke.

The matching shapes can be on the material bridges such that the different sectors are assembled at the material bridges. Preferably, the matching shapes of the different sectors are assembled outside the deformable zones of the material bridges. This facilitates assembly, notably in the case of large machines. For example, the sectors have hollow shapes cooperating with the matching projecting shapes of an adjacent sector.

In a variant, the ring has a stack of precut magnetic sheets.

In another variant, the ring is made by additive manufacturing, for example by powder sintering.

The yoke can be made by winding a strip of sheet metal directly into a helix if the width permits, forming suitable slits in said strip of sheet metal during cutting or otherwise to facilitate said winding, by stacking precut magnetic sheets, or by additive manufacturing, for example by powder sintering.

The yoke is attached to the ring after installation of the windings in the slots.

Windings

The windings can be arranged in the slots in a concentrated or distributed manner.

"Concentrated" means that each winding is wound about a single tooth.

"Distributed" means that at least one of the windings passes successively through two non-adjacent slots.

Preferably, the windings are arranged in the slots in a distributed manner, notably when the number of poles in the rotor is equal to or less than 8.

Each of the windings has at least one electrical conductor that can have a circular cross section or a polygonal cross section with rounded edges, preferably rectangular. This list is not limiting.

Where the conductors have a circular cross section, the conductors can be arranged in the slot in a hexagonal stack. Where the conductors have a polygonal cross section, the conductors can be arranged in the slot in one or more rows oriented radially. Optimized stacking can enable more electrical conductors to be arranged in the slots, thereby producing a more powerful stator for the same volume.

The electrical conductors can be arranged randomly in the slots or in rows. Preferably, the electrical conductors are arranged in rows. "In rows" means that the conductors are not arranged in bulk in the slots, but in an orderly manner. The conductors are arranged in the slots in a non-random manner, for example in one or more rows of aligned electrical conductors, notably in one or two rows, preferably in a single row.

The electrical conductors are preferably insulated electrically from the outside by an insulating coating, notably enamel.

Preferably, the windings are separated from the walls of the slot by an insulator, notably by at least one insulating sheet. Such a sheet insulator provides improved electrical insulation of the windings in relation to the slot.

Preferably, each slot receives at least two windings, notably at least two windings of different phases. These two windings can be radially superposed.

The two windings can be separated from one another by at least one insulating sheet, preferably by at least two insulating sheets.

Each winding can be formed by several turns.

In a variant, the windings are pin windings, notably U-pin or I-pin windings, including in this case an I-shaped or U-shaped portion, the ends of which are welded to the conductors outside the corresponding slot.

The stator can be skewed. Such skewing can help to clamp the windings in the slots and to reduce the slot harmonics.

Machine and Rotor

The invention also relates to a rotating electrical machine including a stator as defined above. The machine can be synchronous or otherwise. The machine can be reluctance machine. The machine can be a synchronous motor.

The rotating electrical machine can include a wound rotor or a permanent-magnet rotor.

Manufacturing Method and Machine

The invention also relates to a manufacturing method for a stator as defined above, including the step of inserting the windings in the slots of the ring of the stator.

During this step, at least one winding can be placed in two different non-consecutive slots of the ring of the stator.

Preferably, the method includes a step of deforming the deformable zone or zones during assembly of the yoke on the ring and/or insertion of the windings in the slots. Such a deformation can change the diameter of the ring and the width of the slots.

The step of inserting the windings in the slots can be performed to widen the slots by extending the material bridges. This also increases the external diameter of the ring. This facilitates insertion of the windings.

The windings are preferably inserted into the slots by means of an inward radial movement of the windings.

The step of assembling the yoke on the ring can result in a reduction in the internal diameter of the ring by compressing the material bridges. This enables the yoke and the ring to be assembled with a minimal clearance between these latter in order to improve electrical performance by reducing the sum of the air-gaps of the magnetic pole.

Preferably, the method can include a step of cutting the ring and the yoke simultaneously from the same sheet with one or more common cuts, notably with a single cut. In this case, the step of assembling the yoke on the ring can result in a reduction in the external diameter of the ring by compressing the material bridge or bridges. Indeed, stresses are generated when cutting the ring and the yoke with a press, and the cut material is then released, which results in an extension of the material beyond the cutting line and makes it difficult to assemble the two parts at the common cut in the absence of said bridges.

The method can include a step of deforming the deformable zones to increase the diameter of the ring, thereby reducing any clearance between the ring and the yoke following the step of assembling the yoke on the ring.

BRIEF DESCRIPTION OF THE DRAWINGS

The invention is further explained in the detailed description given below of non-limiting example embodiments of the invention and the attached drawings, in which.

DETAILED DESCRIPTION

Figure 1:
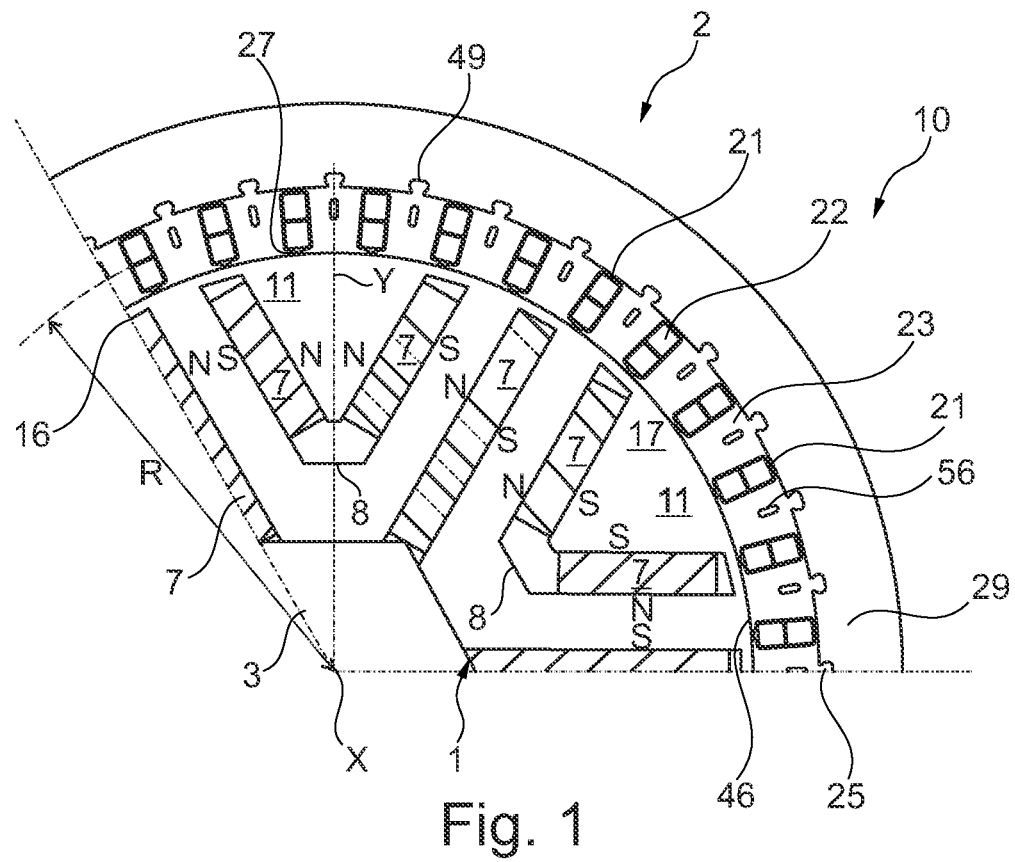
FIG. 1 is a schematic partial cross section of a machine including a stator according to the invention.

FIG. 1 shows a rotating electrical machine 10 with a rotor 1 and a stator 2. The stator is used to generate a rotary magnetic field to drive the rotor 1 as part of a synchronous motor and, in the case of an alternator, the rotation of the rotor induces an electromotive force in the windings of the stator.

The examples illustrated below are schematic and the relative dimensions are not necessarily respected.

Stator

The stator 2 has windings 22 that are arranged in the slots 21 formed between the teeth 23 of an indented ring 25. The slots are closed on the side of the air-gap by material bridges 27, each linking two consecutive teeth of the ring 25.

The stator 2 has a yoke 29 attached to the ring 25.

In the example described, the slots 21 have parallel radial edges 33 and have a substantially rectangular section in a plane perpendicular to the rotation axis X of the machine.

The bottom of the slots 35 fits the shape of the windings 22, with the exception of a recess 40. In the example in FIGS. 1 to 4, the bottom of the slots 35 has two flat portions 30 on either side of the recess 40 against which the rectangular windings 22 bear. The bottom of the slots 35 is joined to the radial edges 33 by rounded edges 36.

The recess 40 is a longitudinal groove extending along the rotation axis X of the machine, centered on the bottom of the slot 21.

The recess 40 preferably has a depth p of between 0.4 mm and 1 mm, for example 0.6 mm.

Each of the material bridges 27 preferably has a deformable zone 32 that enables the circumference e thereof, which is the width of the slots 21, to be varied, thereby varying the mean internal diameter 2R of the ring 25.

In the example shown, the deformable zones 32 are corrugations.

The material bridges 27 are of variable width, and the deformable zones 32 are the narrowest zones. The narrowest point of the material bridges 27 is preferably between 0.3 mm and 0.6 mm, for example 0.4 mm.

Figure 2:
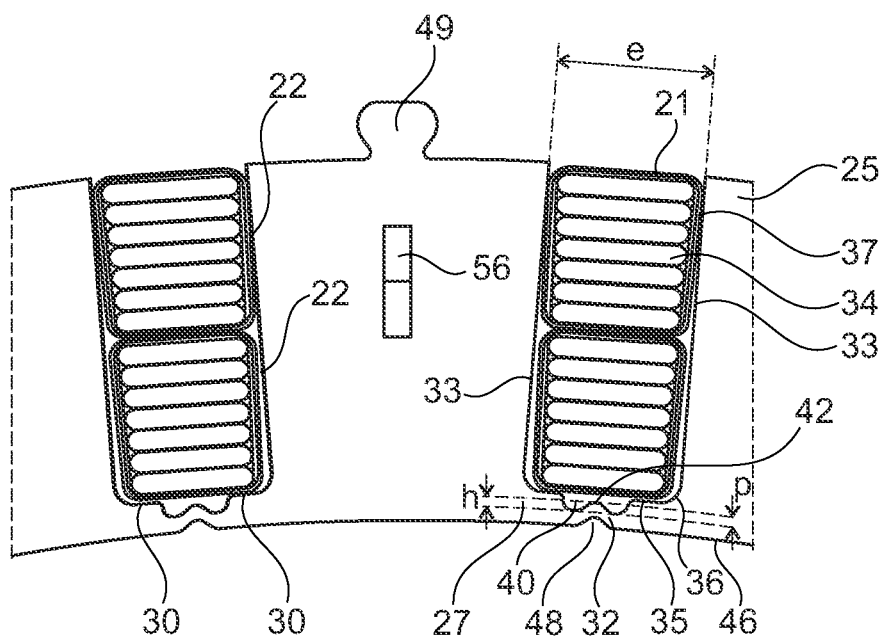
FIG. 2 is a schematic view of a portion of the ring of the stator of the machine in FIG. 1.

As shown in FIG. 2, each corrugation forms a projecting relief 42 that extends into the recess 40 on the side of the bottom of the slots 35, and a groove 48 on the side of the air-gap 46.

Each projecting relief 42 forms a rib with a rounded apex. The height h of the relief is less than the depth p of the recess 40 so as not to exceed the latter.

The grooves 48 are channels of rounded section in a plane perpendicular to the axis X.

Figure 3:
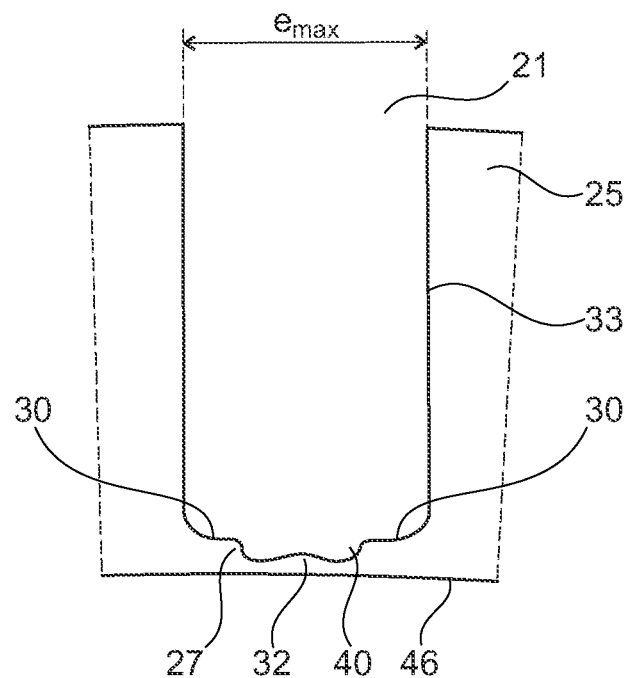
FIG. 3 shows a portion of the ring of the stator in FIG. 2, in which the deformable zones are enlarged.

As shown in FIG. 3, when the deformable zones 32 are stretched, the grooves 48 and projecting reliefs 42 are flattened, thereby elongating the material bridge and enlarging the slot.

Figure 4:
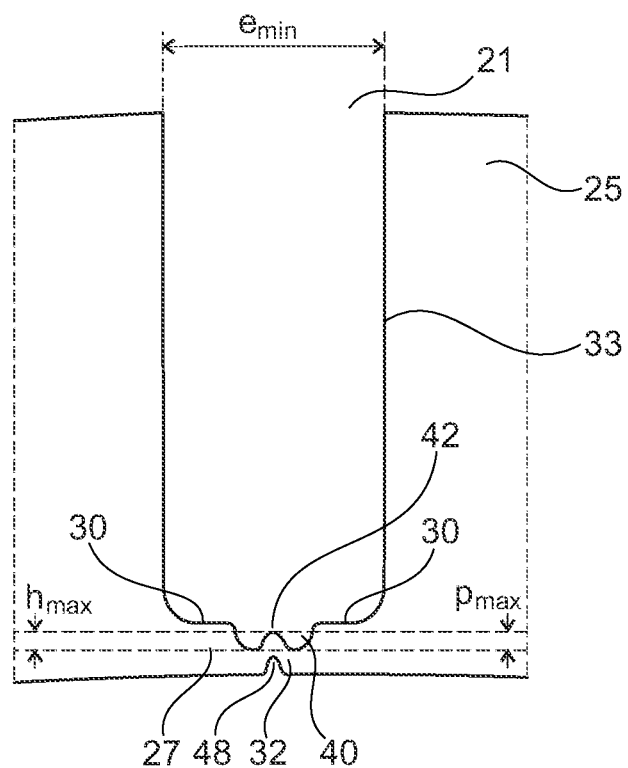
FIG. 4 shows the portion of the ring of the stator in FIG. 2, in which the deformable zones are compressed.

As shown in FIG. 4, when the ring 25 is compressed, the grooves 48 and the projecting reliefs 42 fold up. The height $h_{max}$ of the projecting reliefs 42 is greater than the height h with no deformation and the depth $p_{max}$ of the deformations 40 is greater than the depth p with no deformation, the height $h_{max}$ being less than the depth $p_{max}$ of the corresponding recess 40.

The ring 25 and/or the yoke 29 are each formed by a packet of magnetic sheets stacked along the axis X, the sheets being for example identical and exactly superposed. The sheets can be held together by snap-fitting, rivets, ties, welding and/or any other technique. The magnetic sheets are preferably made of magnetic steel.

In the example illustrated, the teeth 23 of the ring 25 have matching surface reliefs 56 enabling the different sheets making up the ring 25 to be snap fitted together. The matching reliefs 56 can be on all of the teeth 23 or only on some of the teeth 23, for example on every other tooth 23.

In a variant, the sheets are bonded together or assembled in another manner.

Similarly, the yoke 29 can have matching surface reliefs to snap fit the different sheets making up the yoke 29 together. The ring and/or the yoke can also be formed from a strip of cut sheet wound about itself.

The yoke 29 is mounted on the ring 25 in a form-fitting manner. The ring 25 and the yoke 29 have matching reliefs 49 on the outer surface of the ring and the inner surface of the yoke, enabling these elements to be held in position in relation to one another.

Windings

The windings 22 can be arranged in the slots 21 in a concentrated or distributed manner, preferably distributed.

In the example shown in FIG. 2, the electrical conductors 34 of the windings 22 are arranged in rows in the slots.

As illustrated in FIG. 2, the electrical conductors 34 preferably have a flat rectangular cross section and are superposed radially for example in a single row. The electrical conductors 34 are enameled or coated with any other suitable insulating coating.

Each slot 21 can receive two stacked windings 22 of different phases. Each winding 22 can have a substantially rectangular cross section.

Each winding 22 is wrapped in an insulating sheet 37 to insulate the windings from the walls 33 and 36 of the slot and the windings 22 of different phases.

The electrical conductors 22 are assembled in windings 22 outside the slots 21 and wrapped in an insulating sheet 27 and the windings 22 with the insulating sheets 37 are inserted into the slots 21. This operation is facilitated by the fact that the slots are open fully and radially outwards, and by the fact that the material bridges are deformable.

Rotor

The rotor 1 shown in FIG. 1 has a central opening 5 for assembly on the shaft and has a magnetic rotor mass 3 extending axially along the rotation axis X of the rotor, this rotor mass being for example formed by a packet of magnetic sheets stacked along the axis X, the sheets being for example identical and exactly superposed.

The rotor 1 for example has a plurality of permanent magnets 7 arranged in the seats 8 of the magnetic rotor mass 3. In a variant, the rotor is wound.

Manufacturing Method for the Stator and Machine

The stator can be obtained using the manufacturing method described below.

The windings 22 are inserted into the slots 21 of the ring 25 by means of a radial movement of the windings 21 towards the inside of the slots 21. During insertion of the windings 22, the slots 21 can be enlarged by deformation of the deformable zones of the material bridges 27. The external diameter of the ring 25 can therefore be greater than before winding.

In the following step, the yoke 29 is securely attached to the ring 27. This assembly can result in a reduction of the enlarged external diameter of the ring 25 by deformation of the deformable zones 32. The clearance between the ring and the yoke is then minimal.

Figure 5:
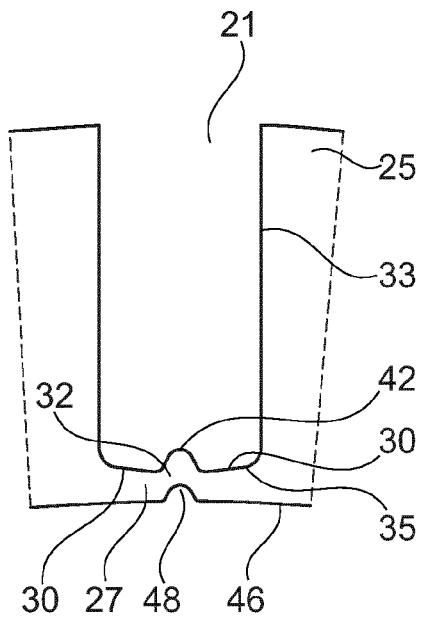
FIG. 5 shows a variant in the form of the material bridges and slots, FIG. 6 show a variant in the form of the material bridges and slots, FIG. 7 show a variant in the form of the material bridges and slots.

The embodiment in FIG. 5 differs from the embodiment in FIGS. 1 and 2 in that the bottom of the slot 21 has no recess. The projecting reliefs have a rounded section in a plane perpendicular to the axis X.

Figure 6:
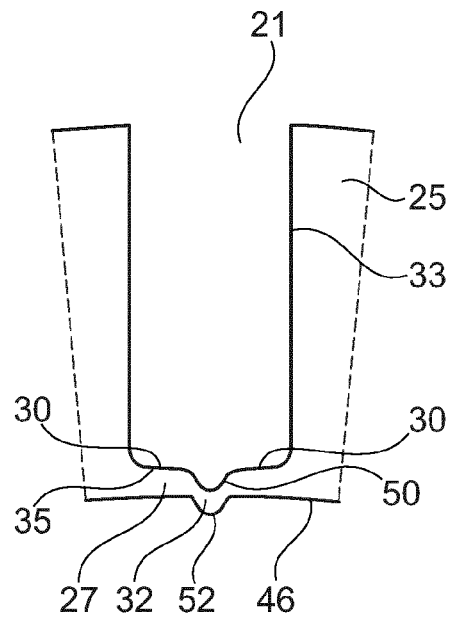

The embodiment in FIG. 6 differs from the embodiment in FIGS. 1 and 2 in that the bottom of the slot 21 has no recess and in that each of the corrugations is formed by a groove 50 oriented towards this bottom of the slot 21 and a projecting relief 52 extending into the air-gap 46.

Figure 7:
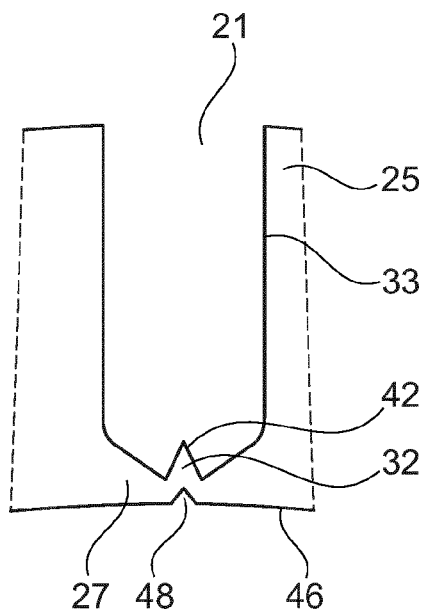

The embodiment in FIG. 7 differs from the embodiment in FIG. 5 in that the profile of the grooves 48 and of the projecting reliefs 42 is a V-shaped broken line, and in that the bottom of the slot 21 decreases in width towards the projecting relief from the radial edges 33 of the slot 21.

Figure 8:
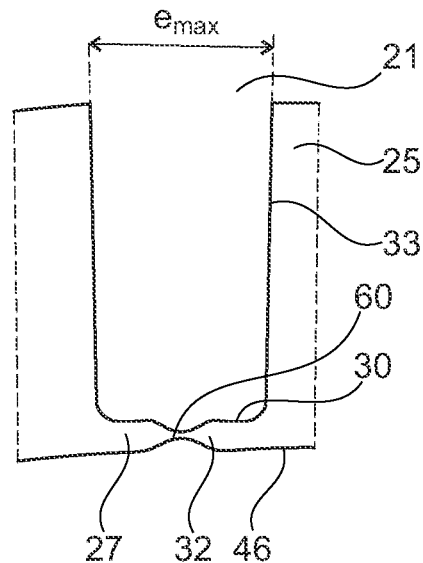
FIG. 8 shows a variant portion of the ring of the stator, in which the deformable zones are enlarged.
Figure 9:
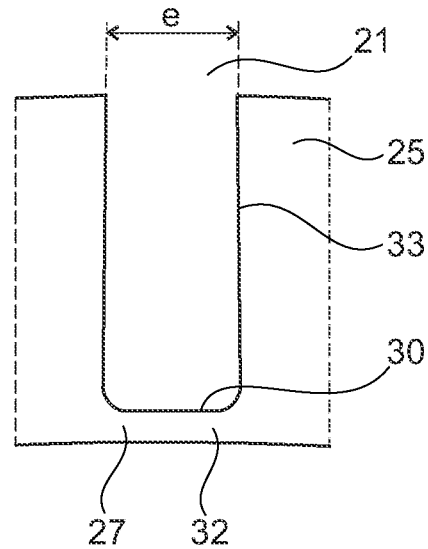
FIG. 9 shows the portion of the ring of the stator in FIG. 8, in which the deformable zones are compressed.

The embodiment in FIGS. 8 and 9 differs from the embodiment in FIGS. 1 and 2 in that the deformable zone is a zone that can be stretched and deformed by stretching to form a constriction 60. When stretched, as shown in FIG. 8, the deformable zone 32 can narrow locally. Before assembly of the yoke, the thickness of the material bridge 27 can be constant, as shown in FIG. 9.

Figure 10:
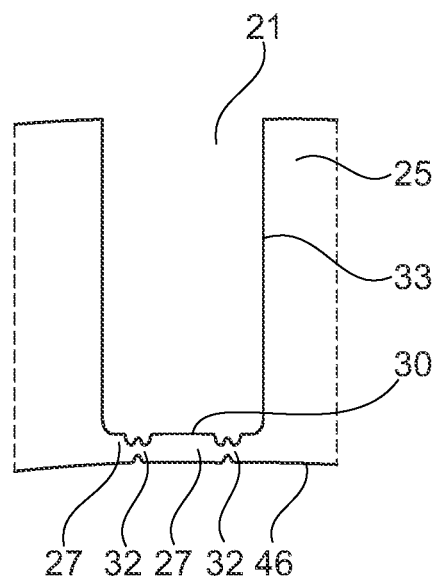
FIG. 10 shows a variant portion of the ring of the stator.

The embodiment in FIG. 10 differs from the embodiment in FIGS. 1 and 2 in that the bottom of the slot has two deformable zones 32 as described above.

Figure 11:
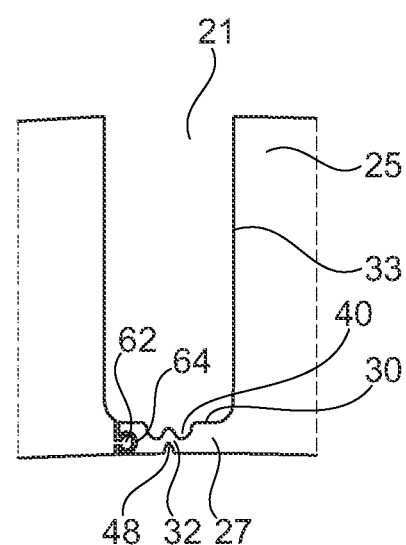
FIG. 11 shows a variant portion of the ring of the stator.
Figure 12:
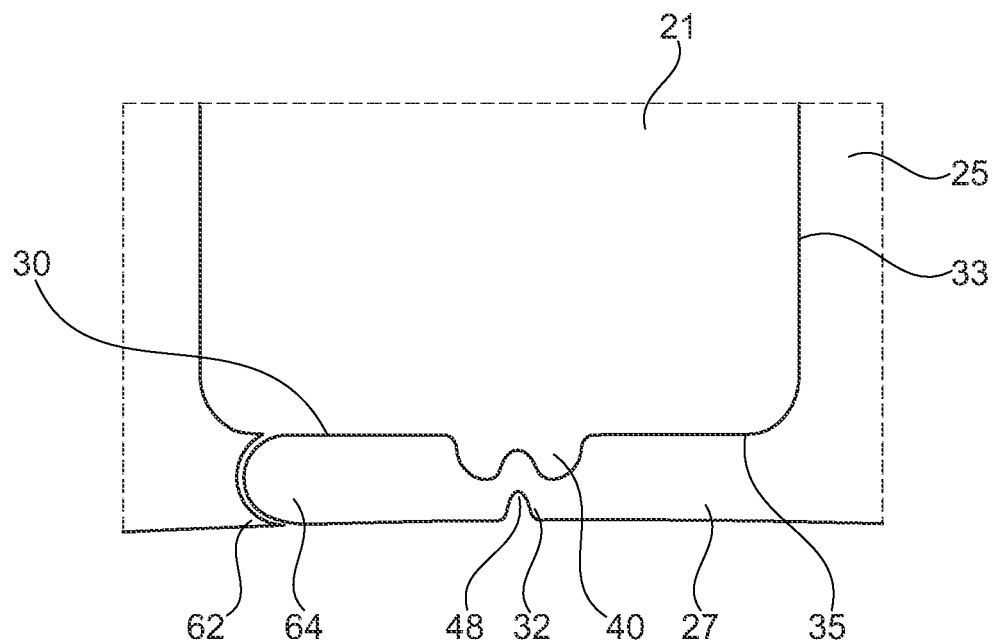
FIG. 12 shows a variant portion of the ring of the stator.
Figure 13:
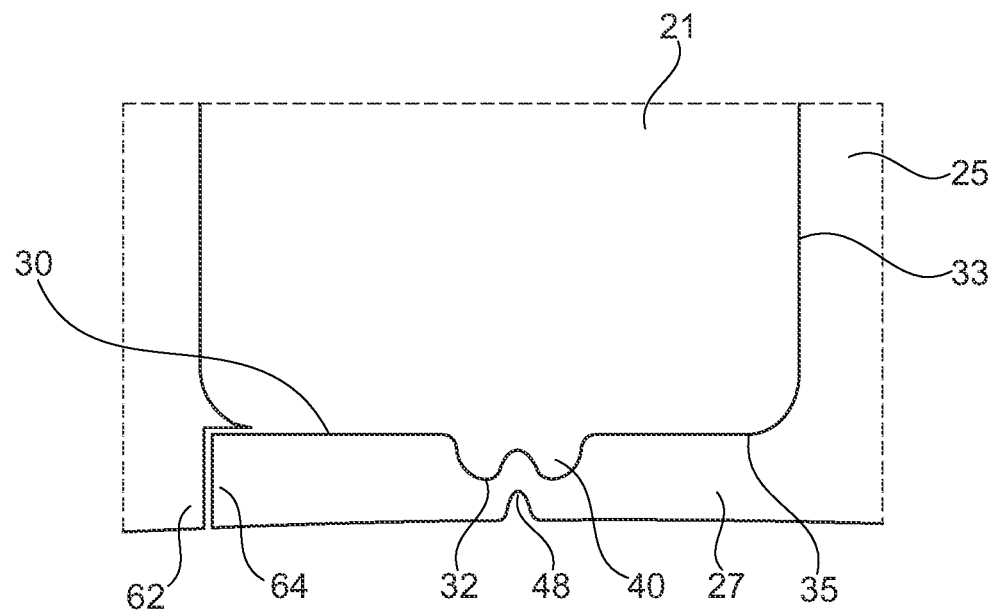
FIG. 13 shows a variant portion of the ring of the stator.

The embodiments in FIGS. 11 to 13 differ from the embodiment in FIGS. 1 and 2 in that at least some of the material bridges 27 have matching reliefs 62 and 64. These matching reliefs 62 and 64 can be in a zone of the material bridge 27 other than the deformable zone 32. In these embodiments, the ring 25 is made by assembly of the sheet metal sectors that are assembled together circumferentially by means of the matching reliefs 62 and 64. The matching reliefs 62 and 64 can be matching reliefs that are fastened together, such as dovetails and mortises, as shown in FIG. 11. This enables two sectors to be fastened together with the ring extended or compressed. In a variant, as shown in FIGS. 12 and 13, the matching reliefs 62 and 64 are respectively projecting and recessed reliefs with matching shapes that bear against one another without the reliefs 62 and 64 being fastened to one another, by compression of the ring 25, notably by the yoke 29. This enables two sectors to be held adjacent by engagement of the reliefs 62 and 64 and by pressing the reliefs 62 and 64 against one another while compressing the ring.

Naturally, the invention is not limited to the example embodiments described above, and the deformable zones need not be centered.

The invention is not limited to the example material bridges illustrated, and these latter can be made in other forms, for example with multiple corrugations.

The expression "including one" should be understood to mean the same as "including at least one".

The invention claimed is:

1. A stator comprising:
   a ring comprising:
      teeth and slots that open radially outwards between said teeth, and
      material bridges, each linking two adjacent teeth to a respective base on the side of the air-gap,
   a yoke attached to the ring, and
   windings placed in the slots of the ring,
   at least some of the material bridges having at least one deformable zone that is a corrugation forming at least one groove on one of the sides of the material bridge and a projecting relief on the opposite side, wherein the projecting relief or reliefs extend into a recess in the bottom of the corresponding slot, the stator being configured such that the deformable zone is deformed during assembly of the yoke on the ring.

2. The stator as claimed in claim 1, in which each material bridge has at least one deformable zone.

3. The stator as claimed in claim 1, wherein the grooves open towards the air-gap and the projecting relief or reliefs extend into the bottom of the corresponding slot.

4. The stator as claimed in claim 1, wherein each material bridge has a deformable zone with a center line having a curved profile or in the form of a broken line when the stator is viewed along the rotation axis.

5. The stator as claimed in claim 1, wherein the deformable zone is a zone of the material bridge that can be stretched and deformed by stretching to form a constriction during assembly of the yoke on the ring and/or during insertion of the windings in the slots.

6. The stator as claimed in claim 1, wherein the deformable zones are zones of the material bridge that are saturated magnetically during operation of the machine.

7. The stator as claimed in claim 1, wherein each of the slots has at least one flat portion against which bears a winding.

8. The stator as claimed in claim 1, wherein the ring has reliefs on the radially external surface thereof that cooperate with the cooperating reliefs of the yoke.

9. The stator as claimed in claim 1, wherein each of the windings has at least one electrical conductor with a rectangular cross section.

10. The stator as claimed in claim 1, wherein each slot receives two windings of different phases.

11. A rotating electrical machine including a stator as claimed in claim 1 and a rotor.

12. A manufacturing method for a stator as claimed in claim 1 comprising a step of deforming the deformable zone or zones during assembly of the yoke on the ring.

13. The method as claimed in claim 12, wherein a step of inserting the windings in the slots is performed to widen the slots by extending the material bridges.

14. The method as claimed in claim 12, wherein a step of assembling the yoke on the ring reduces a diameter of the ring by compressing the material bridges.

15. The method as claimed in claim 14, further comprising a step of cutting the ring and the yoke simultaneously from the same sheet by means of one or more common cuts.

16. A manufacturing method as claimed in claim 12, comprising a step of deforming the deformable zone or zones during insertion of the windings in the slots.

17. The stator as claimed in claim 1, wherein the projecting relief or reliefs are of height h equal to or less than the depth p of the recess.

18. A stator comprising:
   a ring comprising:
      teeth and slots that open radially outwards between said teeth, and
      material bridges, each linking two adjacent teeth to a respective base on the side of the air-gap,
   a yoke attached to the ring, and
   windings placed in the slots of the ring, at least some of the material bridges having at least one deformable zone that is a corrugation forming at least one groove on one of the sides of the material bridge and a projecting relief on the opposite side, wherein the grooves open towards the air-gap and the projecting relief or reliefs extend into the bottom of the corresponding slot, the stator being configured such that the deformable zone is deformed during assembly of the yoke on the ring.

* * * * *